(12) United States Patent
El-Soudani

(10) Patent No.: US 7,093,470 B2
(45) Date of Patent: Aug. 22, 2006

(54) METHODS OF MAKING INTEGRALLY STIFFENED AXIAL LOAD CARRYING SKIN PANELS FOR PRIMARY AIRCRAFT STRUCTURE AND FUEL TANK STRUCTURES

(75) Inventor: Sami M. El-Soudani, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 592 days.

(21) Appl. No.: 10/253,172

(22) Filed: Sep. 24, 2002

(65) Prior Publication Data

US 2004/0055349 A1 Mar. 25, 2004

(51) Int. Cl.
*B21D 26/08* (2006.01)

(52) U.S. Cl. ............................. 72/56; 72/341; 29/421.2

(58) Field of Classification Search .................. 72/56, 72/57, 60, 55, 341; 29/421.2
See application file for complete search history.

(56) References Cited

U.S. PATENT DOCUMENTS

| | | | | |
|---|---|---|---|---|
| 3,643,482 | A | | 2/1972 | Hertel et al. .................... 72/56 |
| 3,976,269 | A | | 8/1976 | Gupta ........................ 244/119 |
| 4,133,471 | A | * | 1/1979 | Niwatukino ................ 228/107 |
| 4,411,380 | A | | 10/1983 | McWithey et al. .......... 228/181 |
| 4,574,451 | A | * | 3/1986 | Smashey et al. .............. 29/423 |
| 4,593,870 | A | | 6/1986 | Cronkhite et al. ....... 244/117 R |
| 4,725,334 | A | * | 2/1988 | Brimm ......................... 216/34 |
| 4,748,837 | A | * | 6/1988 | Kurosawa et al. ............. 72/63 |
| 4,749,155 | A | | 6/1988 | Hammer et al. ............. 244/123 |
| 5,327,358 | A | | 7/1994 | Stubbs ......................... 364/507 |
| 5,626,051 | A | * | 5/1997 | Sabin ......................... 72/379.6 |
| 5,988,566 | A | | 11/1999 | Meyer ...................... 244/129.3 |
| 6,261,395 | B1 | | 7/2001 | Duffy ........................... 156/64 |
| 6,502,788 | B1 | | 1/2003 | Noda et al. .................. 244/123 |
| 6,511,570 | B1 | | 1/2003 | Matsui ....................... 156/245 |
| 2001/0004096 | A1 | | 6/2001 | Entelmann et al. .......... 244/119 |
| 2001/0015043 | A1 | | 8/2001 | Brenneis et al. .............. 52/630 |

FOREIGN PATENT DOCUMENTS

| | | |
|---|---|---|
| EP | 0 078 891 A | 5/1983 |
| EP | 0 288 705 A | 11/1988 |
| EP | 0 590 262 A | 4/1994 |
| EP | 1 245 317 A | 10/2002 |
| RU | 2 106 218 C | 3/1998 |
| WO | WO 02055383 | 7/2002 |

OTHER PUBLICATIONS

PCT International Search Report re; PCT/US03/21865, dated Apr. 29, 2004.
PCT International Search Report dated Jan. 28, 2004 for International Application No. PCT/US03/27213 filed Sep. 2, 2003.
McCoskey et al., U.S. Appl. No. 10/226,922 filed Aug. 23, 2002 entitled "Integrally Stiffened Axial Load Carrying Skin Panels for Primary Aircraft Structure and Closed Loop Manufacturing Methods for Making the Same".

* cited by examiner

*Primary Examiner*—Daniel C. Crane
(74) *Attorney, Agent, or Firm*—Harness Dickey & Pierce P.L.C.

(57) ABSTRACT

Methods for making skin panels suitable for use in aircraft structures and fuel tank structures, such as fuselages and reusable launch vehicle propellant tanks. A first method includes the following steps: machining a starting plate to a final part geometry; and explosive forming the machined plate to at least one of a uniaxial curvature and a biaxial curvature. A second method includes the following steps: explosive forming a starting plate to at least one of a uniaxial curvature and a biaxial curvature; and machining the curved plate to a final part geometry. Accordingly, the invention enables making integrally stiffened unitized axial load carrying skin panels that are either uniaxially or biaxially curved.

21 Claims, 6 Drawing Sheets

METHODS OF MAKING INTEGRALLY STIFFENED AXIAL LOAD CARRYING SKIN PANELS FOR PRIMARY AIRCRAFT STRUCTURE AND FUEL TANK STRUCTURES

FIELD OF THE INVENTION

The present invention relates generally to aircraft and more particularly to methods of making skin panels for primary aircraft structures and fuel tank structures, such as fuselages, reusable launch vehicle (RLV) propellant tanks or aircraft fuel tanks.

BACKGROUND OF THE INVENTION

The current method of designing and constructing primary airliner structures, such as fuselages, is called semi-monocoque. The semi-monocoque structure contains thousands of detail parts riveted into substantially transverse stiffeners or ribs (also called frames) and into substantially longitudinal stiffeners or ribs (also called stringers), both of which are riveted to the skin. Although semi-monocoque structures have been successful for their intended purpose, it would be even more desirable to provide structures that are even less labor intensive, costly, and time-consuming to design, fabricate and assemble.

More specifically, the design phase for a traditional semi-monocoque jetliner requires designing thousands of details, splices, and assemblies and specifying a whole range of rivet types, their respective locations and spacing. Fabricating thousands of detail parts and maintaining configuration control while doing so can be extremely complicated. Accordingly, a great number of fabrication shops are typically employed to fabricate the various parts of a semi-monocoque design for a major airliner. Indeed, it is not uncommon for a commercial jetliner to contain about three million (3,000,000) holes drilled through parts with an equal number of fasteners installed, which is all done and orchestrated through and by over one thousand (1000) fabrication shops.

Assembling a conventional semi-monocoque aircraft involves riveting thousands of detail parts into the frames and stringers, which in turn are riveted into the axial load carrying skins. The complex assembly of thousands of such detail parts requires specifications, fabrication, and tracking of a whole range of rivet types and small parts, their locations, spacings, etc. for fastening the thousands of parts into the semi-monocoque structure. Accordingly, a great number of assembly shops are typically needed to assemble a conventional semi-monocoque aircraft. Indeed, it is not uncommon for nearly one hundred (100) assembly shops to be involved in the assembly of a commercial jetliner.

In view of the foregoing, it will be readily apparent that it would be highly beneficial to provide an aircraft structure that may be assembled with significantly less fastener holes, while those fastener holes which are still employed would facilitate a fully determinately assembled product requiring no or little drilling at the assembly operation.

Historical studies of aircraft indicate that fastener holes are the source or origination location for nearly all fuselage cracks, which tend to reduce the service life of the airframe. In addition, it is also known that fastener holes are the major culprit in the development of multi-site fatigue damage, fretting corrosion, and costly aircraft inspection, refurbishing and maintenance. With less fastener holes, less time would be needed for conducting routine inspections of and for repairing fastener holes to ensure the structural integrity of the airliner.

Providing an aircraft structure that is even less costly to design, fabricate, and assemble than the current semi-monocoque structures would be financially beneficial to both airframe manufacturers from the fabrication standpoint and to airline operators from the "Cost of Ownership" and maintenance standpoints. It is well known in the industry that "Cost of Ownership" has become the largest single fixed component of operating jetliner aircraft. The "Cost of Ownership" burden is shifting rapidly to the aircraft manufactures with the increasing airline industry trend toward leasing rather than owning jetliners.

Although airline structure costs and the affordability thereof are dependent at least in part on the time and labor required for and complexities associated with the design, fabrication, and assembly of the aircraft structure, other factors also are important. Aircraft structure costs, affordability and to a degree weight are driven not only by large part counts, but also by failsafe considerations and by stringer splice repair procedures. On the one hand, there is the increased cost of designing, testing and life demonstration; and on the other hand, wherever service life may be limited or reduced, there is naturally the increased cost of inspections and stringer splice repairs associated with large numbers of fastener holes.

Furthermore, the number of aircraft manufacturers owning commercial aircraft has increased as a result of the increasing trend of airline operators to lease rather than own commercial aircraft. Accordingly, it would be beneficial to such aircraft manufacturers to increase the service life and economically viable life limit of operating their commercial jetliner inventory. Thus, it would be beneficial to provide structures that are even more durable and damage-tolerant and have increased fatigue capabilities.

Accordingly, a need remains for methods of making skin panels that are suitable for fuselages and other primary aircraft structure wherein the skin panels and the aircraft structures formed therewith are even less labor-intensive and costly to design, fabricate, assemble, inspect and repair than existing designs. Ideally, the methods would provide skin panels that are capable of being used to form more durable and damage-tolerant structures with increased fatigue capabilities.

Regarding fuel tank structures, conventional fuel tank structures typically do not have as many parts as conventional semi-monocoque fuselages. However, the methods currently used for making fuel tank skin panels can be costly especially when the skin panels must be provided with biaxial curvatures. For example, a biaxially curved skin panel is needed for propellant tank dome or rounded end portion. Although machining of thick plates and spin forming are successful at providing biaxial curvatures to fuel tank skin panels, it would be beneficial to provide a less costly method of making the same. Accordingly, a need remains for a less costly and more efficient process for making biaxially curved skin panels that are suitable for use with fuel tank structures such as aircraft fuel tanks and RLV propellant tanks.

SUMMARY OF THE INVENTION

The present invention provides methods for making integrally stiffened axial load carrying skin panels suitable for use in aircraft and fuel tank structures. A first method includes the following steps: machining a starting plate to a final part geometry; and explosive forming the machined plate to at least one of a uniaxial curvature and a biaxial curvature. A second method includes the following steps:

explosive forming a starting plate to at least one of a uniaxial curvature and a biaxial curvature; and machining the curved plate to a final part geometry. Accordingly, the invention enables the efficient production of lightweight, unitized integrally stiffened axial load carrying skin panels suitable for use in any one of a wide range of aircraft and fuel tank structures that translate loads between axially load carrying skins and stiffening features (e.g., ribs, stiffeners, frame outer chords, stringers, etc.) and/or flanges.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features or components throughout the drawings.

DETAILED DESCRIPTION OF THE PREFERRED EMBODIMENTS

Figure 1:
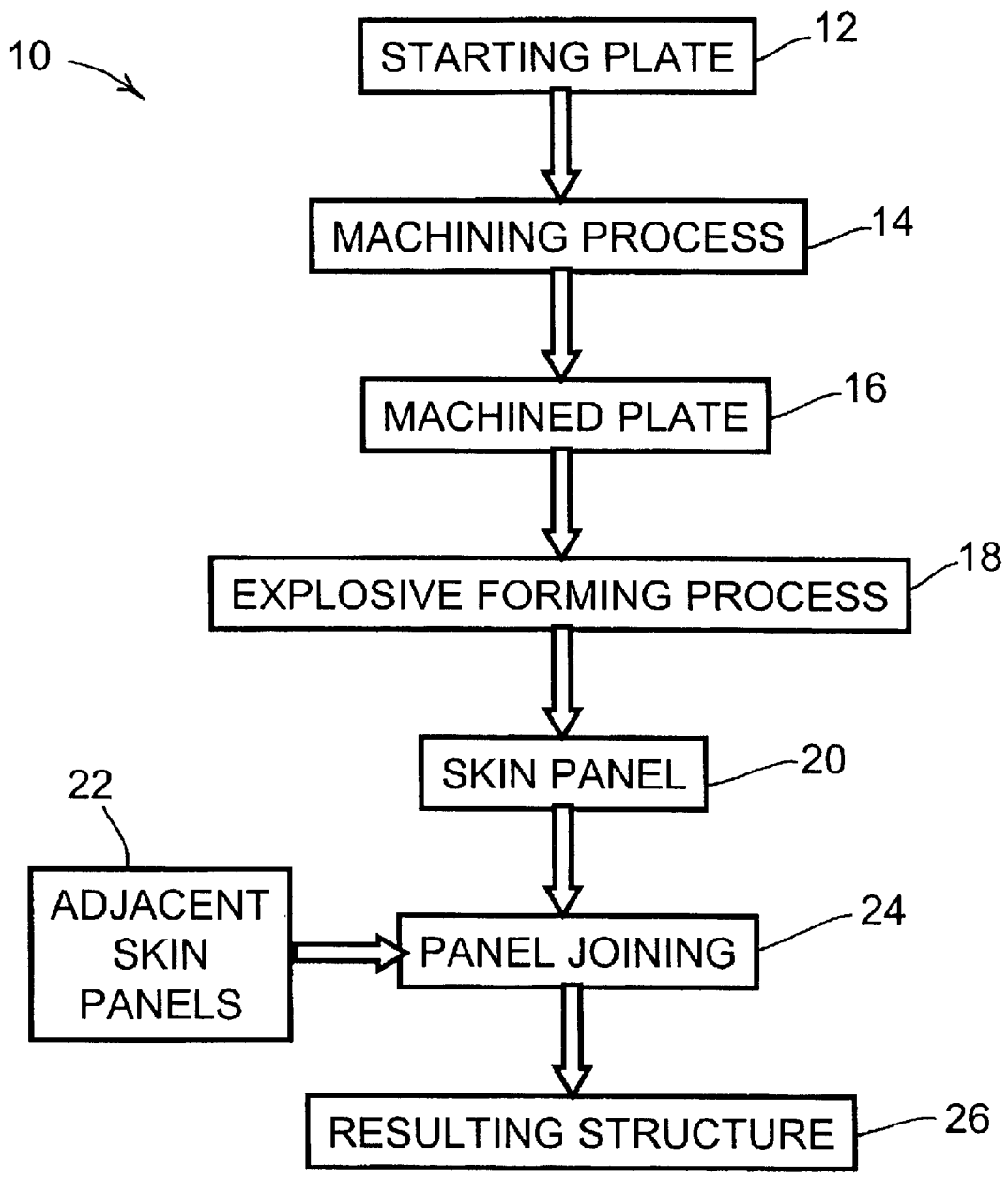
FIG. 1 is a high level process flow diagram of a first method of making a skin panel according to one preferred embodiment of the present invention.
Figure 2:
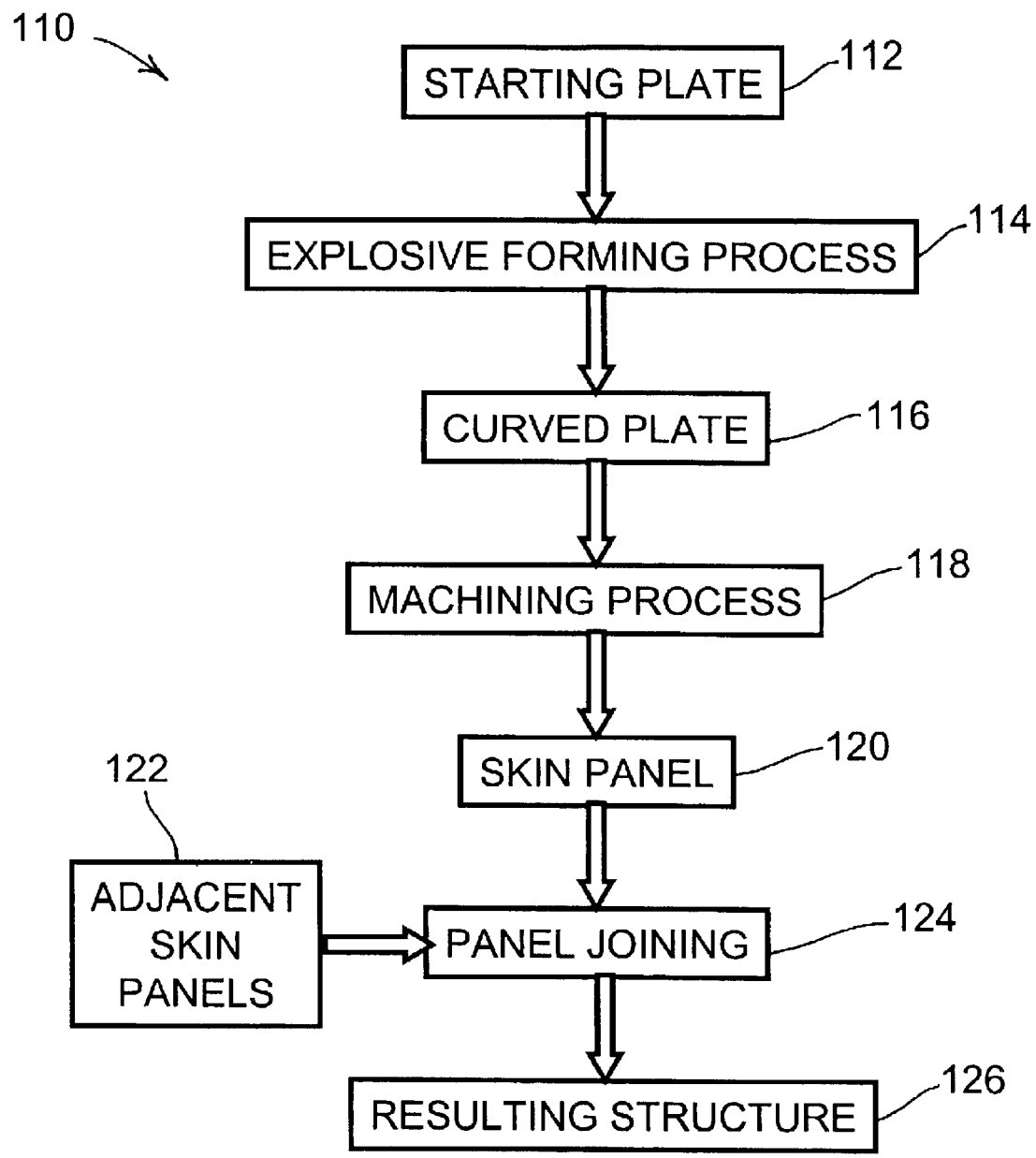
FIG. 2 is a high level process flow diagram of a second method of making a skin panel according to a second preferred embodiment of the present invention.

FIG. 1 is a high level process flow diagram of a first method, generally indicated by reference number 10, according to one preferred embodiment of the present invention. FIG. 2 is another high level process flow diagram but of second method, generally indicated by reference number 110, according to a second preferred embodiment of the present invention. Generally, each preferred method 10, 110 integrates machining and explosive forming processes in a unique and innovative manner to introduce novel features into skin panel forming methodology. Accordingly, the present invention provides methods for making integrally stiffened, unitary, axial load carrying skin panels that are either uniaxially or biaxially curved. The skin panels are suitable for use in any one of a wide range of aircraft and fuel tank structures that translate loads between axially load carrying skins and stiffening features (e.g., ribs, stiffeners, frame outer chords, stringers, etc.) and/or flanges, such as aircraft fuselages, reusable launch vehicle (RLV) propellant tanks or aircraft fuel tanks.

As shown in FIG. 1, the first method embodiment 10 generally comprises the following steps. First, an initial parent or starting plate 12 is machined to a final part geometry via a machining process 14. The machining process 14 involves machining at least one stiffener into the starting plate 12 and machining the starting plate 12 from a first thickness down to a second or suitable skin thickness. The final part geometry thus includes an axial load carrying skin and the at least one stiffener integrally engaged with the axial load carrying skin. As used herein, an axial load carrying skin shall be construed to be a skin capable of translating loads from and into stiffening features (e.g., ribs, stiffeners, stringers, frame outer chords, etc.) and/or flanges, wherein the axial loads can be either compression, tension or both compression and tension.

The machined plate 16 is then provided with an appropriate or required curvature via an explosive forming process 18. Because explosive forming is used to provide the curvature, the machined plate 16 is provided with either a uniaxial or a biaxial curvature. Accordingly, the method 10 allows for the manufacture of an integrally stiffened, axial load carrying, unitary/monolithic skin panel 20 having either a cylindrical/uniaxial curvature or a compound/biaxial curvature. The skin panel 20 provides greater torsional strength, stiffness, damage tolerance, and fatigue capabilities than that provided by a conventional fabricated skin panel.

The curvature that is selected for the axial load carrying skin panel 20 will likely depend at least in part on the particular structural location for which the skin panel 20 is being created. For example, the skin panel 20 should be biaxially curved if the skin panel 20 is going to form a portion of an RLV propellant tank dome. The plate 12 may be provided with any number of (i.e., one or more) machined stiffeners comprising substantially longitudinal ribs, stringers, substantially transverse ribs, frame inner chords, flanges, isogrid stiffeners, substantially diagonal ribs, etc. In short, the final part geometry and curvature provided to the skin panel 20 via the machining and explosive forming processes 14 and 18, respectively, may vary but will depend at least in part on the design requirements for the skin panel 20.

Figure 8A:
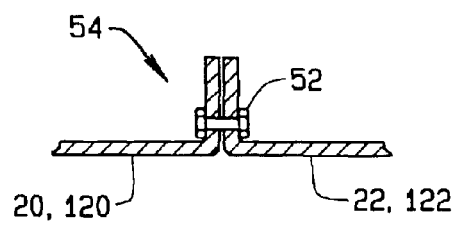
FIG. 8a is a cross-sectional side view of an exemplary tension joint that may be used to join adjacent skin panels.
Figure 8B:
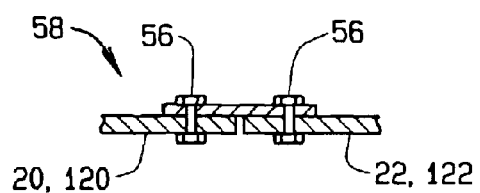
FIG. 8b is a cross-sectional side view of an exemplary shear joint that may be used to join adjacent skin panels.
Figure 8C:
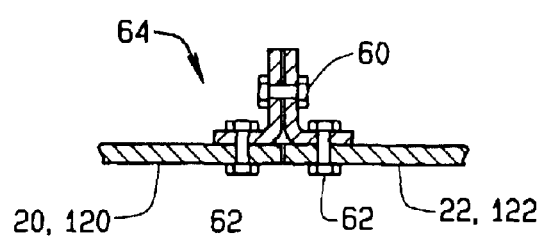
FIG. 8c is a cross-sectional side view of an exemplary combination tension-shear joint that may be used to join adjacent skin panels.

The method 10 may further comprise joining 24 the skin panel 20 to one or more adjacent skin panels 22 to either complete or at least form a portion of a fuselage, fuel tank or other aircraft structure 26, as the case may be. Preferably, the skin panel 20 is joined to the adjacent skin panels 22 via fasteners 52 that form tension joints 54 between the skin panels 20 and 22, as shown in FIG. 8a. However, other methods of joining the skin panel 20 to the adjacent skin panels 22 may also be employed. For example, the skin panel 20 may be joined to the adjacent skin panels 22 with fasteners 56 (e.g., nut and bolt assemblies, rivets, among other suitable fasteners) that form shear joints 58 (FIG. 8b) or with fasteners 60 and 62 (e.g., nut and bolt assemblies, rivets, among other suitable fasteners) that form combination tension-shear fastener joints 64 (FIG. 8c). Or for example, the skin panel 20 may alternately or additionally be joined to the adjacent skin panels 22 via a welding process (e.g., friction stir welding), heat fusion process, among other processes.

Figure 3:
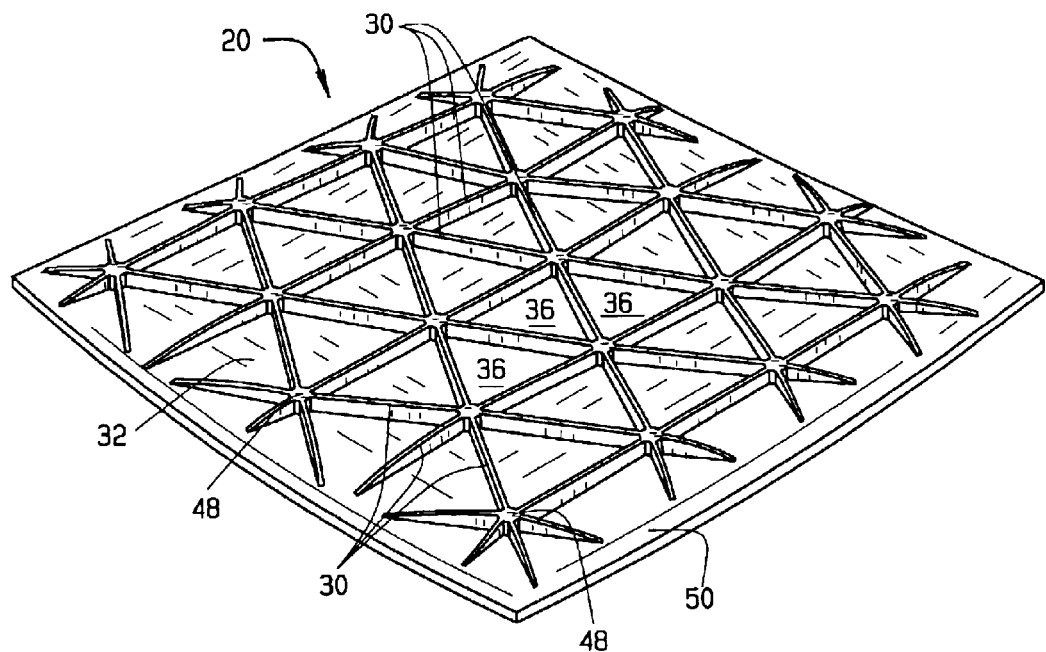
FIG. 3 is an inward perspective view of an integrally stiffened axial load carrying skin panel made in accordance with either of the methods shown in FIG. 1 or FIG. 2.

As shown in FIG. 3, the skin panel 20 includes an interior side 32 that comprises a plurality of machined ribs or stiffeners 30 that define an isogrid pattern or configuration. Stated differently, the various ribs 30 are arranged to define a plurality of pockets 36 that are each substantially shaped as an equilateral triangle. In short, the skin panel 20 comprises an isogrid or triangular panel. As used herein, an "isogrid panel" shall be construed to be a plate or face sheet with triangular integral stiffening ribs or stringers. The term isogrid is used because an isogrid panel acts substantially like an isotropic material. Accordingly, the skin panel 20 when provided with an isogrid or triangular pattern as shown in FIG. 3, is highly efficient by taking advantage of the fact that triangular trusses are very efficient structures. Moreover, the machined stiffeners 30 being integrally engaged or formed with the inner skin surface 32 allow for the translation of loads between the stiffeners 30 and the skin in a manner such that stresses are not focused into high concentrations.

Figure 6:
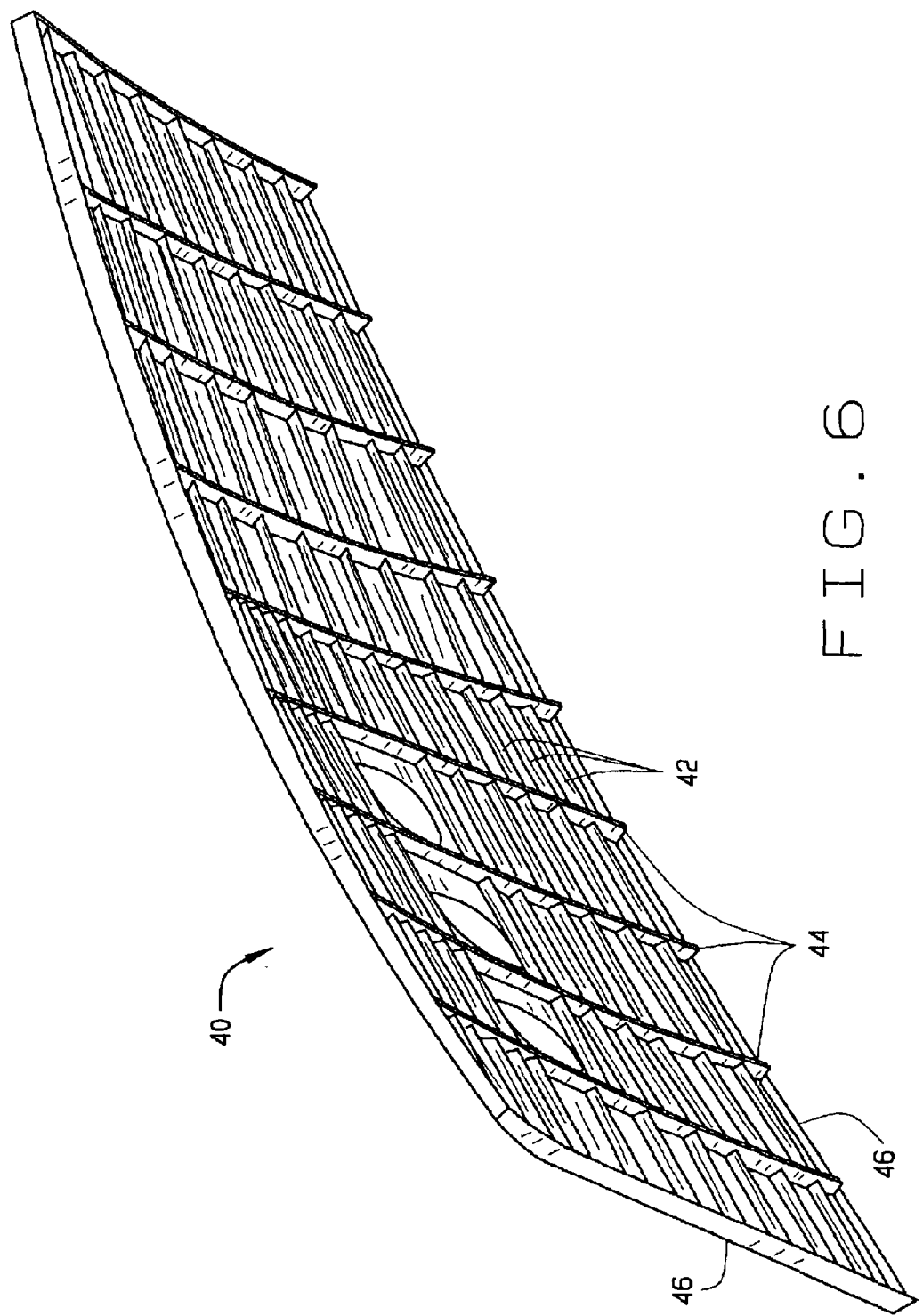
FIG. 6 is a perspective view of a second embodiment of an integrally stiffened axial load carrying skin panel made in accordance with either of the methods shown in FIG. 1 or FIG. 2.

Alternatively, the skin panel 20 may be provided with any suitable number of (i.e., one or more) pockets depending at least in part on the particular application for which the skin panel 20 is being fabricated. The pockets can be configured to whatever geometry is most suitable for translating the stress loads, which are local to the particular skin panel's utilization and operational requirements. The pocket configurations may be variations of an isogrid, rectangular, or any other configuration suitable for the local conditions and requirements. For example, the skin panel may be provided with a rectangular pattern of ribs defining rectangular pockets as is shown in FIG. 6. Or for example, the skin panel may be provided with a square pattern of ribs.

In addition, the stiffeners 30 of skin panel 20 may include any one of a wide range of cross-sections. For example, the stiffeners 30 may include one of the cross-sections shown in FIG. 7c, although such is not required.

As previously described, explosive forming is used to provide the finish-machined panel 16 with a final-curvature shape or curved contour (e.g., uniaxially curved, biaxially curved). Briefly, explosive forming is a well known process wherein an explosive is used to generate shock waves through a transmission medium (e.g., water, oil, gelatin, liquid salts, air, etc.) which are directed to deform a workpiece (e.g., aluminum plate, etc.). The explosive force transmitted through the medium pushes the workpiece material to substantially conform to a die cavity disposed adjacent the workpiece. Accordingly, the final-curvature provided to the finish-machined panel 16 is dictated by the die surfaces (e.g., machined steel die surfaces, etc.) against which the finish-machined panel 16 is impacted.

Figure 4:
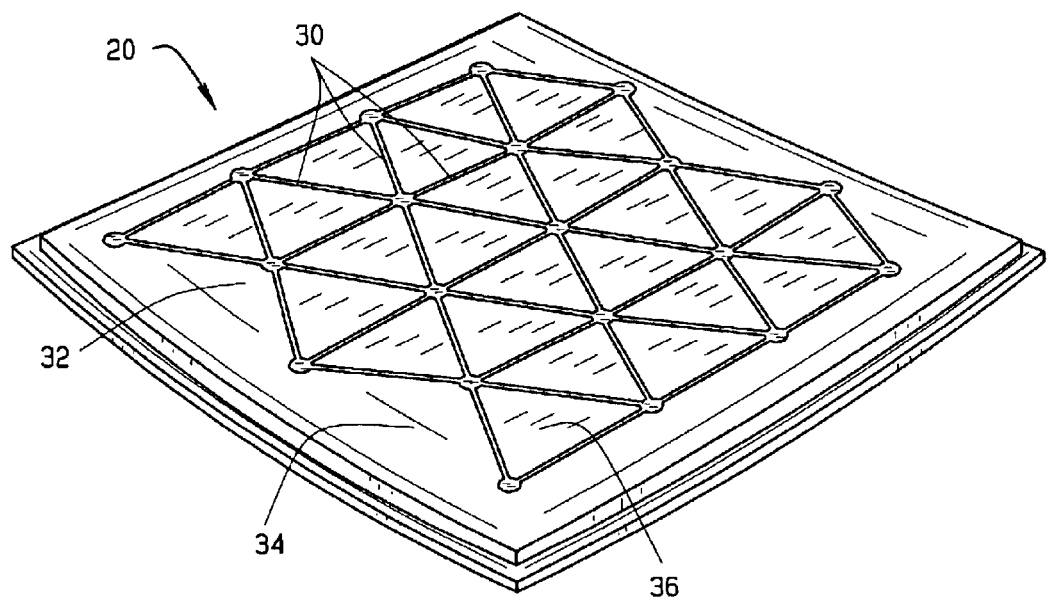
FIG. 4 is a perspective view of the skin panel of FIG. 3 shown with its interior substantially filled with a filler material.

To protect the stiffeners or ribs 30 from distorting or buckling during the explosive deformation process 18, an eutectic and readily removable filler material 34 is preferably disposed within the pockets 36 of the finish-machined plate 16. The filler material 34 is preferably filled up to the substantially full height of the stiffeners 30 as is shown in FIG. 4. Accordingly, the method 10 may further comprise the step of applying a filler material 34 to the interior side 32 of the machined plate 16 before the explosive forming process 18 but after the machining process 14. Although any one of a wide range of suitable filler materials may be used, in a preferred embodiment the commercially available "Wood's Metal" filler is used as the filler material 34.

Figure 5:
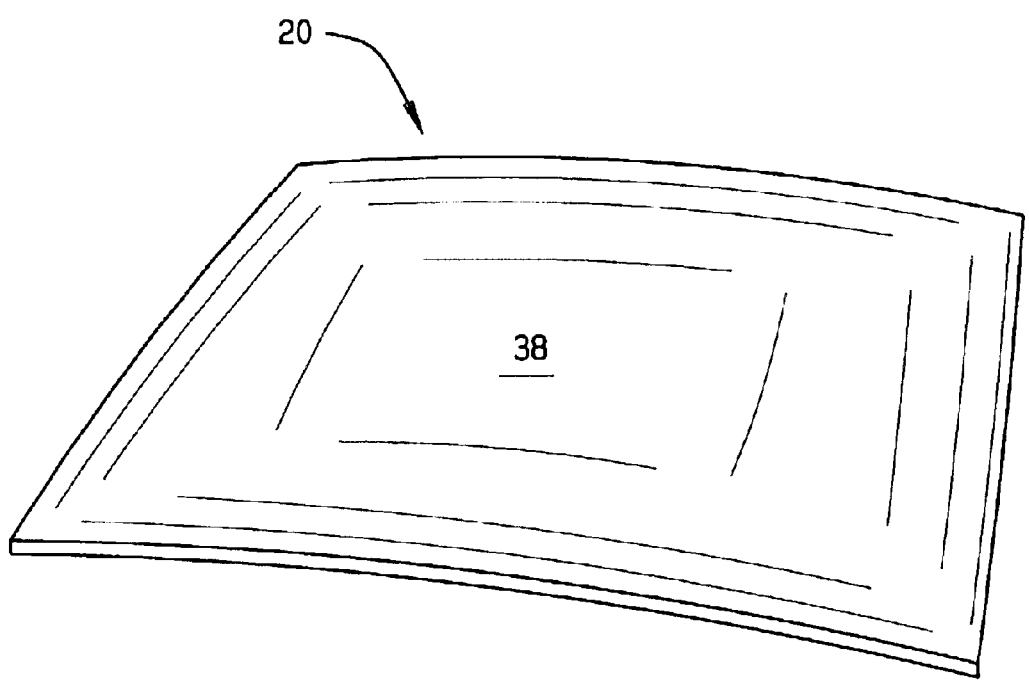
FIG. 5 is an outside perspective view of the skin panel of FIG. 3 showing its outer mold line surface.

To avoid outer surface irregularities, care should be taken to prevent the filler material 34 from being disposed on the outer mold line surface of the machined or formed part 16. By doing so, the resulting skin panel 20 may be provided with an outer mold line surface 38 that is substantially smooth with a high or production-wise quality surface finish, as is shown in FIG. 5.

Additionally, it should also be noted that the isogrid pattern shown in FIG. 3 for the skin panel 20 is not to be considered a limiting design feature for the skin panel fabrication methods 10 or 110. An appropriate filler material 34 is capable of flowing around a wide range of patterns and configurations. For example, either of the methods 10 or 110 may be used to produce an integrally stiffened, unitary, biaxially curved skin panel 40 that includes a substantially rectangular pattern of stiffeners or ribs (e.g., stringers 42, frame inner chords 44, flanges 46), as shown in FIG. 6. The skin panel 40 is more thoroughly shown and described in the copending application titled "INTEGRALLY STIFFENED AXIAL LOAD CARRYING SKIN PANELS FOR PRIMARY AIRCRAFT STRUCTURE AND CLOSED LOOP MANUFACTURING METHODS FOR MAKING THE SAME" of McCoskey, et al., U.S. patent application Ser. No. 10/226,922, filed Aug. 23, 2002, which is commonly assigned with the present application, and the contents of which are incorporated herein by reference. The methods 10 or 110 may also be used to make any one of the other skin panels described in the McCoskey patent application.

It should also be noted that the number, arrangement, geometry, shape, and dimensional size of the skin panels and the various components comprising the skin panels may also vary from what is shown and described herein without departing from the spirit and scope of the present invention. The particular skin panel configuration will likely depend at least in part on the particular application (e.g., type of aircraft, structural location, etc.) for which the skin panel is intended. For example, the curvature of the skin panel will depend at least in part on the structural location or placement for the skin panel, whereas the rib configuration and geometry will depend at least in part on the load case that must be accommodated by the skin panel.

The present invention is also not limited to fuselage structures but is also applicable to other primary aircraft structures that employ axial load carrying skins (e.g., including, but not restricted to, wings, empennages, pressure bulkheads, wing carry through sections, escape hatches, passenger doors, cargo doors, access hatches and panels, etc.) and fuel tank structures. For example, the present invention may be used to produce affordable, ultralightweight, yet robust, and hydrogen impermeable propellant tanks for RLVs.

In a manner similar to that described above, the propellant tank dome and/or side wall panels for an RLV are preferably high-speed machined to their final wall thicknesses from a flat plate to a configuration including at least one integral stiffener or rib. Next, the substantially flat inexpensively machined panels are then explosively formed to the appropriate shape and curvature (e.g., uniaxial for the cylindrical tank walls, and biaxial for the bulkhead hemispherical surfaces) using the same filler material technique described earlier and shown in FIG. 3. The large explosively formed panel segments may then be assembled by fastener joints (e.g., tension joints, shear joints, combination thereof, etc.), welding processes (e.g., friction stir welding which is a low-risk final assembly process with minimal distortions, etc.), heat fusion processes, among other processes. This assembly process also allows for attachment of external features and system components such as insulation materials and for incorporating inlet/outlet porthole structures, sealants, etc.

Referring back to FIG. 2, the second method embodiment 110 generally comprises the following steps. First, an initial parent or starting plate 112 is curved via an explosive forming process 114. Because explosive forming is used, the starting plate 112 is provided with either a uniaxial or a biaxial curvature. Next, the curved plate 116 is machined to a final part geometry via a machining process 118. The machining process 118 involves machining at least one stiffener into the curved plate 116 and machining the curved plate 116 from a first thickness down to a second or suitable skin thickness. The final part geometry thus includes an axial load carrying skin and the at least one stiffener integrally engaged with the axial load carrying skin. Accordingly, the method 110 allows for the manufacture of an integrally stiffened, axial load carrying unitary skin panel 120 having either a cylindrical/uniaxial curvature or a compound/biaxial curvature. The skin panel 120 provides greater torsional strength, stiffness, damage tolerance, and fatigue capabilities than that provided by a conventional fabricated skin panel.

As before with the method 10, the second method 110 may also comprise the additional step of joining 124 the skin panel 120 to one or more adjacent skin panels 122 to either complete or at least form a portion of a fuselage, fuel tank or other aircraft structure 126, as the case may be. Preferably, the skin panel 120 is joined to the adjacent skin panels 122 via fasteners 52 that form tension joints 54 between the skin panels 120 and 122, as shown in FIG. 8a. However, other methods of joining the skin panel 120 to the adjacent skin panels 122 may also be employed. For example, the skin panel 120 may be joined to the adjacent skin panels 122 with fasteners 56 (e.g., nut and bolt assemblies, rivets, among other suitable fasteners) that form shear joints 58 (FIG. 8b) or with fasteners 60 and 62 (e.g., nut and bolt assemblies, rivets, among other suitable fasteners) that form combination tension-shear fastener joints 64 (FIG. 8c). Or for example, the skin panel 120 may alternately or additionally be joined to the adjacent skin panels 122 via a welding or heat fusion process, such as friction stir welding, among other processes.

The curvature provided to the skin panel 120 via the explosive forming process 114 may vary but will likely depend at least in part on the particular structural location for which the skin panel 120 is being created. For example, the skin panel 120 should be biaxially curved if the skin panel 120 is intended for an RLV propellant tank dome.

The skin panel 120 may be provided with any number of (i.e., one or more) stiffeners with such stiffeners comprising substantially longitudinal ribs, stringers, substantially transverse ribs, frame inner chords, flanges, isogrid stiffeners, substantially diagonal ribs, etc. The stiffeners of skin panel 120 may include any one of a wide range of cross-sections including but not limited to the cross-sections shown in FIG. 7c.

Additionally, the machining process 118 may be used to provide the curved plate 116 with an isogrid rib pattern as shown in FIG. 3 or other rib patterns (e.g., square rib pattern, rectangular rib pattern shown in FIG. 6, etc.). Indeed, the pockets defined by the stiffeners of the skin panel 120 may be configured to whatever geometry is most suitable for translating the stress loads, which are local to the particular skin panel's 120 utilization and operational requirements.

Moreover, the second thickness down to which the curved plate 116 is machined may also vary. By way of example only, the range for the second thickness may be about 0.030 inches to 0.080 inches (0.0762 centimeters to 0.2032 centimeters), which is readily achievable with existing high-speed machining processes. In short, the final part geometry provided to the skin panel 120 via the machining process 118 may vary but will depend at least in part on the design requirements for the skin panel 120.

The method 110 may be used to create skin panels 20 or 120 from a full-thickness plate. Nevertheless, it is generally preferred that the initial plate thickness of the starting plate 112 be minimized as allowed by detail design considerations to allow for improved handling and improved plate properties.

The methods 10 and 110 are ideally suitable for the fabrication of affordable, ultralight-weight, yet rugged, fuel-compatible, and insulatable propellant tank structures for RLVs (e.g., single-stage-to-orbit propellant tank structures) and fuel tank structures for aircraft. However, the methods 10 and 110 are also readily applicable to the fabrication of unitized, integrally stiffened, axial load carrying skin panels suitable for other primary aircraft structures, such as fuselages, wings, empennages, pressure bulkheads, wing carry through sections, escape hatches, passenger doors, cargo doors, access hatches and panels, etc.

It is generally preferred that the drilling of fastener holes into the skin panels 20 and 120 for miscellaneous component attachments and given part assembly to next-assembly skin panels 22 and 122 be performed after the skin panels 20 and 120 have acquired their final geometrical configuration. That is, the drilling of fastener holes preferably occurs only after both the machining and explosive forming processes 14, 18, 114, 118 have been completed in the methods 10 and 110.

The methods 10 and 110 may also include the additional step of drilling nodal blind holes (not shown) into the nodes or rib intersections 48 (FIG. 3). The nodal blind holes may extend downwardly into the rib intersections 48 without penetrating the skin 50 of the skin panel 20 or the skin of the skin panel 120. Accordingly, the nodal blind holes reduce the weight of the skin panels 20 and 120 and may also be used for secondary system support.

The starting plates 12 and 112 used in the methods 10 and 110 preferably comprise suitable machinable material. By way of example only, the plates 12 and 112 may each comprise an aluminum alloy such as 2024-T3 aluminum alloy, aluminum-lithium alloy 2090, among other suitable 2000 series aluminum alloys. Alternatively, however, any of a wide range of other suitable materials may be used for the plates 12 and 112.

The explosive forming processes 18, 114 of methods 10 and 110 are preferably performed in water or another suitable coolant environment to allow for ambient temperature forming of the plates 16, 112 and thus the preservation of the post heat treat properties of the plates 16, 112 during the forming processes 18, 114. Likewise, a coolant is preferably used during the machining processes 14, 118 of methods 10 and 110 to allow for ambient temperature machining of the plates 12, 116 and thus the preservation of the post heat treat properties of the plates 16, 112 during the machining processes 14, 118. Because the heat treat properties are preserved during the machining and explosive forming processes 14, 18, 114, 118, the starting plates 12 and 112 are preferably in their final heat treat condition.

In addition, it is preferable that the machining processes 14, 118 comprise high-speed numerically-controlled (NC) machining processes, although such is not required. High-speed machining allows for the machining of vertical walls down to an appropriate thickness such as 0.030 inches (0.0762 centimeters) without the severe distortion that might otherwise occur with low-speed machining.

The machining processes 14 and 118 are also preferably fully integrated closed system manufacturing systems wherein the chips are kept isolated and segregated within the process and thus kept pure without loss of alloy purity. Such tightly controlled material segregation ensures that the chips may be reused as original material rather than being recycled as scrap and thus the chips retain their value. That is, the chips are recovered and segregated without allowing any cross-contamination. The chips may then be recycled back to the melt and returned as new production process ready billets.

For example, the fully integrated closed loop manufacturing operation preferably returns one days chips as another subsequent days billet stock without degradation of metallurgical material properties. Further, in an ideal closed loop manufacturing facility, the machining and material segregation and control would be located in close proximity to the mill operation, which creates the billets. Thus, the closed loop operation would be located adjacent to and within a distance of the mill that allows for automated conveyance of the billet to the machining operation from the mill and for the automated return conveyance of the materials to be recycled to the mill from the machining operation.

By using a "closed loop manufacturing machining system" to produce the skin panels and other primary structural components, the buy-to-fly ratios associated with the production of primary aircraft structures may be substantially decreased while incurring only minimal chip reprocessing charges coupled only with the cost of the utilized flight weight material shipped to assembly. In short, the closed loop manufacturing system has a significant positive impact upon the economics normally imposed by the material buy-to-fly ratio.

An exemplary closed-loop manufacturing system typically includes, but is not limited, to following major sequences. The mill formulates the original parent alloy and produces the billets. Next, the mill forms the billets to contour as required when the curvature is formed prior to machining. The mill then transfers the stress-relieved billets to the machining operation. The machining operation would fixture and machine the billets to finished part configurations. The machining operation is preferably facilitated with automated chip recovery equipment that collects the chips, conveys them to a wash station for contaminant (e.g., coolant) removal, and compresses the washed chips into briquettes. The briquettes are ultimately transferred back to the mill to be returned without property loss to the melt. Because the largest percentage of the cost to produce aluminum alloy is usually the energy required to produce new alloy, the closed-loop manufacturing concept delivers unparalleled economies to the integrally machined structures produced thereby.

The methods of the present invention allow for the formation of both uniaxially and biaxially curved skin panels while capturing the benefits of explosive forming. The ability to form biaxially curved skin panels is especially significant when the broad spectrum of fuselage shapes and other aircraft structure shapes are considered which require not only uniaxially curved panels but more often than not biaxially curved panels. Notably, the fabrication of biaxially curved panels is generally not possible with brake forming and pinch rolling.

In addition, explosive forming is particularly suitable for forming numerous design-varied stiffener wall thicknesses from point to point. For example, in the case of a jetliner fuselage skin panel, a designer may wish to use different thicknesses for the various stiffeners depending on the different stress and/or buckling conditions. With a brake forming process, however, the operator would have to accommodate or correct for such varying local conditions, which would be a very labor-intensive process. By capturing the benefits that explosive forming provides over brake forming, pinch rolling and/or composite layups, the present invention allows for the efficient, cost-conscious fabrication of lightweight, unitized integrally stiffened skin panels for fuselage structures and fuel tank structures.

By using explosive forming to impart the required curvatures to the skin panels instead of other machining, the present invention reduces the amount of machining and material needed as compared to a process wherein the curvature is provided via machining. Accordingly, the present invention allows for a more affordable production of skin panels from any of wide range of alloys. For example, the present invention allows manufacturers to inexpensively fabricate large boosters with substantially taller, thin wall isogrid stiffeners without the risk of buckling, cracking, etc., currently exhibited by the labor-intensive brake forming or composite layup autoclave processes.

Figure 7A:
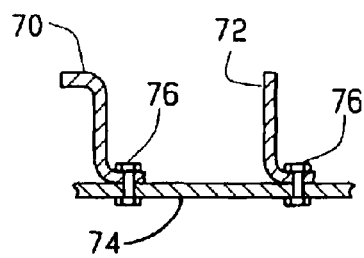
FIG. 7a is cross-sectional side view of an exemplary Z-stiffened and L-stiffened semi-monocoque skin panel.
Figure 7B:
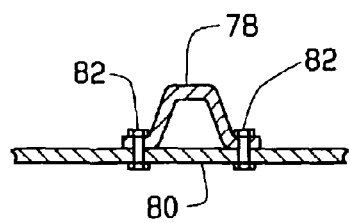
FIG. 7b is a cross-sectional side view of an exemplary hat-section-stiffened built-up skin panel.
Figure 7C:
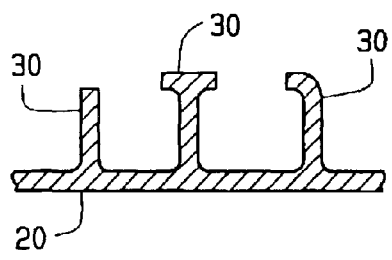
FIG. 7c is a cross-sectional side view of an integrally stiffened axial load carrying skin panel in accordance with the principles of the present invention.

Because the various components comprising the skin panels are integrally formed as a single component structure, the present invention provides several advantages over separately built-up aircraft structures and fuel tanks such as that shown in FIGS. 7a and 7b. Briefly, FIG. 7a shows an exemplary Z-stiffened 70 and L-stiffened 72 semi-monocoque skin panel 74 that includes fasteners 76. FIG. 7b shows a hat-section-stiffened 78 built-up skin panel 80 that includes fasteners 82. In comparison to such semi-monocoque structures, the present invention provides at least the following advantages:

(1) Reduced structural weight;

(2) Reduced detail part count;

(3) Reduced overall "Cost of Ownership";

(4) Reduced complexity and costs associated with the skin panel design, manufacturing, assembly, inspection, and repair of aircraft and fuel tank structures;

(5) Reduced Engineering Drawing tree coordination;

(6) Reduced drag associated with the fuselage skin; and (7) Enhanced structural component life.

Each of the above-identified benefits are more thoroughly described in the McCoskey patent application, the contents of which are incorporated in their entirety herein by reference.

It is anticipated that the invention will be applicable to any of a wide range of aircraft (e.g., but not limited to, fighter jets, commercial jets, private jets, propeller powered aircrafts, among others) regardless of the manner in which the aircraft is piloted (e.g., directly, remotely, via automation, or in a combination thereof, among others). Accordingly, the specific references to aircraft herein should not be construed as limiting the scope of the present invention to only one specific form/type of aircraft or to aircraft alone.

Moreover, the present invention should not be limited to just aircraft either as the invention could be applied in any implementation where an integrally reinforced skin panel might be advantageous. Indeed, it is anticipated that the invention will be equally applicable to other mobile platforms, other component applications, other primary metallic structures of aircraft and not just to aircraft fuselages and fuel tank structures alone. For example, the invention applies equally to other platforms such as missile and rocket launcher systems, expendable booster rockets of large and/or small diameters, ship hulls and superstructures, among others. The invention also applies equally to other aircraft structures that employ axial load carrying skins including, but not restricted to, wings, empennages, pressure bulkheads, wing carry through sections, escape hatches, passenger doors, cargo doors, access hatches and panels, etc. Accordingly, the specific references to the fabrication of the aircraft fuselage and fuel tank structures herein are for purposes of illustration and should not be construed as limiting the scope of the present invention.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. A method of making a skin panel, the method comprising:
   machining a starting plate to a final part geometry including a skin and at least one integral stiffener machined into the plate and extending generally outwardly from the skin; and
   explosive forming the machined plate with its integral stiffener against a forming surface of a rigid die having a contour at least substantially in accordance with a desired curvature for the skin panel, the explosive forming causing the machined plate to substantially conform to the contour of the forming surface to at least one of a uniaxial curvature and a biaxial curvature.

2. The method of claim 1, wherein the machining comprises high-speed machining.

3. The method of claim 1, wherein the machining comprises numerically-controlled (NC) machining.

4. The method of claim 1, wherein the step of machining a starting plate to a final part geometry comprises machining the starting plate from a first thickness down to a second thickness.

5. The method of claim 1, wherein the step of machining a starting plate to a final part geometry comprises machining a plurality of isogrid ribs into the starting plate.

6. The method of claim 1, wherein the step of machining a starting plate to a final part geometry comprises machining a plurality of substantially longitudinal ribs into the starting plate and a plurality of substantially transverse ribs into the starting plate.

7. The method of claim 1, further comprising the step of recycling the chips produced during the machining in a closed loop manufacturing process.

8. The method of claim 1, further comprising the step of providing an interior side of the machined plate with a filler material before the explosive forming to reinforce the stiffener during the explosive forming so as to thereby at least inhibit lateral buckling of the stiffener during the explosive forming.

9. The method of claim 1, further comprising the step of joining the skin panel to an adjacent skin panel.

10. The method of claim 1, further comprising the step of providing the skin panel with at least one hole after the explosive forming.

11. A method of making a skin panel, the method comprising machining a starting plate to a final part geometry including an axial load carrying skin and at least one stiffener machined therein and integrally engaged with the axial load carrying skin, disposing filler material adjacent the stiffener, and explosive forming the machined plate, with its integral stiffener, against a forming surface of a tool having a contour at least substantially in accordance with a desired outer mold line curvature for the skin panel, the explosive forming causing the machined plate to substantially conform to the contour of the forming surface, the filler material reinforcing the stiffener during the explosive forming to at least inhibit lateral buckling of the stiffener during the explosive forming.

12. The method of claim 11, wherein the at least one integral stiffener includes a plurality of integral stiffeners defining at least one pocket, and wherein disposing filler material adjacent the stiffener includes disposing the filler material within the pocket.

13. The method of claim 12, wherein disposing the filler material within the pocket includes disposing the filler material within the pocket up to substantially the full height of the stiffeners defining the pocket.

14. The method of claim 12, wherein the disposing the filler material within the pocket includes pouring molten filler material into the pocket and allowing the molten filler material to solidify before the explosive forming, and wherein the method includes removing the filler material from the pocket after the explosive forming by sufficiently heating the filler material to melt the filler material and then pouring the molten filler material from the pocket.

15. The method of claim 14, wherein the filler material is an eutectic alloy.

16. The method of claim 11, further comprising friction stir welding the skin panel to an adjacent skin panel.

17. The method of claim 12, wherein the machining comprises high-speed machining.

18. The method of claim 17, further comprising recycling the chips produced during the machining in a closed loop manufacturing process.

19. The method of claim 11, wherein the explosive forming is performed in a coolant environment.

20. The method of claim 11, further comprising applying coolant to the starting plate during the machining.

21. The method of claim 11, wherein the method includes machining the starting plate from a first thickness down to a second thickness between 0.030 inches to 0.080 inches.

* * * * *